(12) United States Patent
Ohta

(10) Patent No.: US 9,506,748 B2
(45) Date of Patent: Nov. 29, 2016

(54) SHAPE MEASURING METHOD AND SHAPE MEASUREING DEVICE

(71) Applicant: Nireco Corporation, Hachioji (JP)

(72) Inventor: Yoshitaka Ohta, Hachioji (JP)

(73) Assignee: Nireco Corporation, Hachioji (JP)

( * ) Notice: Subject to any disclaimer, the term of this patent is extended or adjusted under 35 U.S.C. 154(b) by 0 days.

(21) Appl. No.: 14/396,849

(22) PCT Filed: Oct. 12, 2012

(86) PCT No.: PCT/JP2012/076493
§ 371 (c)(1),
(2) Date: Oct. 24, 2014

(87) PCT Pub. No.: WO2014/057580
PCT Pub. Date: Apr. 17, 2014

(65) Prior Publication Data
US 2015/0153161 A1    Jun. 4, 2015

(51) Int. Cl.
*G01B 11/24* (2006.01)
*G01B 11/25* (2006.01)
*G06T 7/00* (2006.01)

(52) U.S. Cl.
CPC ............... *G01B 11/24* (2013.01); *G01B 11/25* (2013.01); *G06T 7/0057* (2013.01); *G06T 2207/20021* (2013.01)

(58) Field of Classification Search
CPC ....... G06K 9/00; G06T 7/00; G06T 2207/00; G01B 11/00; G06F 17/00
USPC .......... 356/601, 606, 604, 237.1–237.6, 634, 356/623
See application file for complete search history.

(56) References Cited

U.S. PATENT DOCUMENTS

| | | | |
|---|---|---|---|
| 4,846,576 A * | 7/1989 | Maruyama | G01B 11/00 356/3.02 |
| 4,976,224 A | 12/1990 | Hatfield | |
| 5,608,817 A | 3/1997 | Yamaoka et al. | |
| 7,502,125 B2 * | 3/2009 | Suzuki | G01B 11/2527 356/603 |
| 7,755,772 B2 * | 7/2010 | Takahashi | G01B 11/2522 356/601 |

FOREIGN PATENT DOCUMENTS

| | | | |
|---|---|---|---|
| JP | 63-149507 A | 6/1988 | |
| JP | 07-324915 A | 12/1995 | |
| JP | 2913903 B2 | 6/1999 | |
| JP | 4696828 B2 | 3/2012 | |

OTHER PUBLICATIONS

International Search Report dated Dec. 11, 2012, issued for PCT/JP2012/076493.

* cited by examiner

*Primary Examiner* — Tarifur Chowdhury
*Assistant Examiner* — Isiaka Akanbi
(74) *Attorney, Agent, or Firm* — Locke Lord LLP

(57) ABSTRACT

The purpose of the present invention is to not only decrease the time required to detect an optical section line in an optical sectioning method but to improve precision in shape measurement of an object to be measured. In this shape measuring method, after an area dividing line is drawn in a region that includes an extracted optical section line and the region is divided into small areas, a longitudinal region is established that spreads in the up and down direction by a plurality of pixels centered around the location of the optical section line in each small area. The next image processing occurs in the whole region of the longitudinal regions.

19 Claims, 7 Drawing Sheets

FIG. 5
FIG. 6
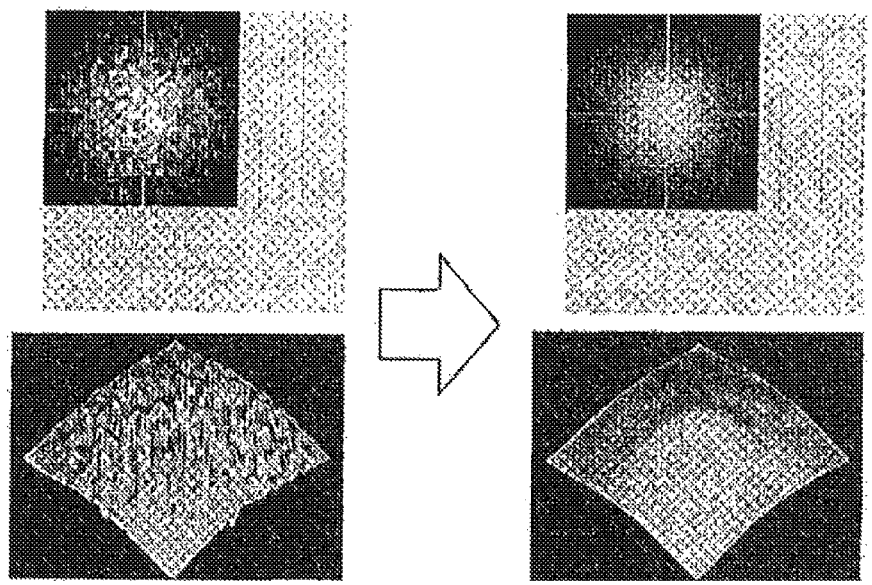
FIG. 7
(A)
| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |
(B)
| $\frac{1}{25}$ | $\frac{1}{25}$ | $\frac{1}{25}$ | $\frac{1}{25}$ | $\frac{1}{25}$ |
|---|---|---|---|---|
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |

FIG. 8
(A) 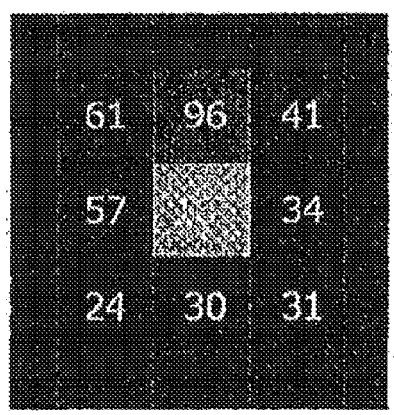
(B) 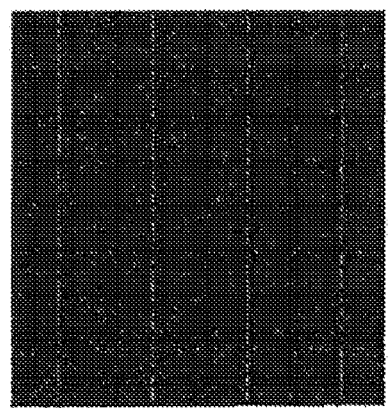
FIG. 9
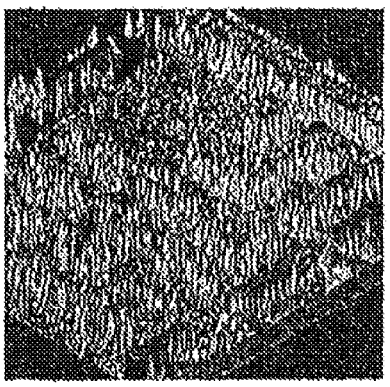 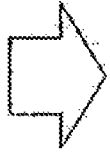 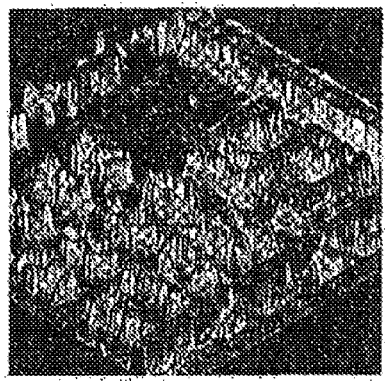
FIG. 10

(A) EROSION →

(B) DILATION →

(A)  (B)  (C)  (D)

SHAPE MEASURING METHOD AND SHAPE MEASUREING DEVICE

TECHNICAL FIELD

The present invention relates to a shape measuring method and a shape measuring device that extract a light-section line from reflected light of slit light projected onto an object which moves in a predetermined direction, and measure a stereoscopic shape of the object, based on the light-section line.

BACKGROUND ART

As a technique for measuring a stereoscopic shape of an object being transferred, there is a light-sectioning method.

Specifically, the light-sectioning method is performed in a manner shown below.

First, a sheet-like or linear light beam is irradiated in a width direction of an object being transferred (a direction orthogonal to a transfer direction of the object), from a light source which is disposed above the object so as to be inclined at a predetermined angle relative to the transfer direction.

Since the light source is inclined relative to the transfer direction, the position of an image formed by the light beam from the light source changes in accordance with the projection and recess of a surface of the object. A light-section line which is an image formed by reflection at the surface of the object is captured by a camera or other imaging devices mounted above and vertically to the object.

The shape of the object on the light-section line is detected based on a positional relationship between the light source and the imaging device and the light-section line on the image.

By continuously detecting the shape of the object on the light-section line in a length direction of the object or continuously detecting the shape of the object moving in the transfer direction, the overall three-dimensional shape of the object can be measured.

In the light-sectioning method, it is important to eliminate the influence of disturbance or noise from an image where a light-section line is captured, to extract the light-section line accurately and sharply.

To attain this objective, various propositions have been made.

For example, in JP 2913903 B1 (Patent Literature 1), a laser is used as a light source, and an interference filter that allows only laser light to pass therethrough is disposed in front of a lens of an imaging device. By this, optical components other than section light are cut off, eliminating disturbance components.

In JP 7-324915 A (Patent Literature 2), laser slit light is used as a light source, and an optical filter is combined with a lens of an imaging device. By this, disturbance components and noise components are removed.

In JP 4896828 B1 (Patent Literature 3), in order to remove disturbance noise that cannot be removed by an interference filter or an optical filter, a small region that limits a light-section line search range is set, and an average value or centroid value of a luminance distribution in the small region is recognized as the position of a light-section line. Furthermore, a variance value of the luminance distribution is determined, and a next adjacent small region is determined based on the variance value. Note that a point with a maximum luminance is searched from a luminance distribution in the entire screen, and a region including the point is set as a measurement start position of a light-section line.

CITATION LIST

Patent Literatures

Patent Literature 1: JP 2913903 B1
Patent Literature 2: JP 7-324915 A
Patent Literature 3: JP 4896828 B1

SUMMARY OF INVENTION

Technical Problem

Ambient light such as outside light and illuminating light includes the same wavelength as or a wavelength close to that of an irradiated light beam of a light-section line. Thus, even if a filter is mounted on a lens of a camera, disturbance light cannot be completely removed, and it is unavoidable that video of a light-section line and video of disturbance light caused by ambient light are simultaneously captured.

In addition, due to the influence of water droplets attached to an object or fumes drifting around the object, the reflectivity of light changes. Thus, the luminance of a light-section line may change.

Due to the above, problems such as those shown below arise.

Firstly, if the luminance of a light-section line is low, the section line cannot be stably recognized.

Secondly, if the luminance of a light-section line decreases to the same level as the luminance of disturbance components, it becomes difficult or impossible to distinguish between the disturbance components and the light-section line.

The above-described Patent Literatures 1 and 2 cannot deal with such problems caused by disturbance light, water droplets, fumes, etc.

On the other hand, in Patent Literature 3 in which a part of a light-section line is extracted and the light-section line is cut out while neighboring points with a high luminance are searched with reference to the point of the extracted part, only a luminance distribution in a region limited by the position of the light-section line is processed. Thus, even if disturbance components located far from the light-section line are not sufficiently removed or if the difference between the luminance of the light-section line and the luminance of disturbance components is small, detection of the light-section line is possible to a certain extent.

In Patent Literature 3, to search for a measurement start point of a light-section line, a point with the highest luminance in a luminance distribution in an image is determined to be a part of the light-section line. Hence, in Patent Literature 3, a part of the light-section line always needs to be reflected at a higher luminance than disturbance components, which, however, may not be always possible if there is a great influence of disturbance components.

In addition, in Patent Literature 3, a small region where a light-section line is searched for is determined based on the variance value of a luminance distribution obtained upon extraction of the light-section line at the previous stage. Furthermore, the position of the light-section line is determined based on the centroid value or average value of a luminance distribution in the small region.

Normally, the variance value of a light source becomes larger toward the outer side, and thus, a region where measurement is performed becomes wider toward the outer side. In addition, when disturbance components are present near the light-section line, the next measurement region becomes larger. Normally, disturbance components exert an influence over a range of a certain size. Thus, if the centroid value or average value of luminance is determined in this state, a position different than the actual one of the light-section line is recognized as the position of the light-section line.

Furthermore, in the case of an object having a high temperature, the object may emit red light. In such a case, the wavelength of the red light from the object and the wavelength of irradiated light from the light source may approximate to each other. Accordingly, reflected light of a light-section line cannot be identified.

An object of the present invention is to provide a shape measuring method and a shape measuring device that can solve such problems with the conventional shape measuring techniques using a light-section line.

Solution to Problem

In order to solve the above-described object, the present invention provides a shape measuring method that extracts a light-section line from reflected light of slit light projected onto an object moving in a predetermined direction, and measures a stereoscopic shape of the object, based on the light-section line, the method including: a first step of drawing an N area division line (N is an integer greater than or equal to 1) in a region including the extracted light-section line, to divide the region into (N+1) small areas, the area division line extending in the predetermined direction; a second step of setting longitudinal regions, each extended in the predetermined direction by an amount corresponding to a predetermined number of pixels, with a position of the light-section line present in a corresponding one of the small areas at a center thereof; and a third step of performing image processing in an overall region of the longitudinal regions provided for each of the small areas, the longitudinal regions being set in the second step.

It is preferable that the shape measuring method according to the present invention includes a fourth step of sequentially extending the longitudinal regions in the predetermined direction by an amount corresponding to a predetermined number of pixels, when pixels having luminances corresponding to the light-section line have not been detected.

In the shape measuring method according to the present invention, it is preferable that the N is determined according to an amount of noise.

In the shape measuring method according to the present invention, when the amount of noise exceeds a predetermined threshold value, it is preferable that the N is, for example, determined from a range of 30 or more, and when the amount of noise is less than or equal to the threshold value, the N is determined from a range of 1 to 29.

In the shape measuring method according to the present invention, it is preferable that the predetermined number is determined according to a movement speed of the object.

In the shape measuring method according to the present invention, it is preferable that the predetermined number is determined according to an amount of change in a shape of the object per unit time, the change being caused by movement of the object.

In the shape measuring method according to the present invention, in the second step, when the light-section line has a convex shape in one direction, it is preferable that longitudinal regions extending only in the one direction are set.

In the shape measuring method according to the present invention, when pixels having luminances corresponding to the light-section line have not been detected in the longitudinal regions extending only in the one direction in all of the longitudinal regions, it is preferable that longitudinal regions extending in an opposite direction to the one direction are set.

In the shape measuring method according to the present invention, in the second step, it is preferable that longitudinal regions extending only in the predetermined direction or an opposite direction to the predetermined direction are set.

In the shape measuring method according to the present invention, when pixels having luminances corresponding to the light-section line have not been detected in all of the longitudinal regions, it is preferable that longitudinal directions extending in an opposite direction are set.

The present invention further provides a shape measuring method that extracts a light-section line from reflected light of slit light projected onto an object moving in a predetermined direction, and measures a stereoscopic shape of the object, based on the light-section line, the method including: a first step of setting a rectangle where a top portion and a bottom portion of the extracted light-section line serve as a top side and a bottom side, respectively, and a maximum value in a leftward and rightward direction of change in the light-section line per unit time serves as a left side and a right side; and a second step of performing image processing in a region in the rectangle set in the first step.

The present invention further provides a shape measuring device including: a light source that irradiates slit light onto an object moving in a predetermined direction; an imaging device that captures reflected light reflected at a surface of the object; a filter that allows only reflected light of a predetermined wavelength to pass through the imaging device; and a control device that controls operation of the light source and the imaging device, and measures a stereoscopic shape of the object, based on a light-section line extracted from an image of the reflected light, wherein the control device: extracts the light-section line from the image of the reflected light; draws an N area division line (N is an integer greater than or equal to 1) in a region including the extracted light-section line, to divide the region into (N+1) small areas, the area division line extending in the predetermined direction; sets longitudinal regions, each extended in the predetermined direction by an amount corresponding to a predetermined number of pixels, with a position of the light-section line present in a corresponding one of the small areas at a center thereof; and performs image processing in an overall region of the longitudinal regions provided for each of the small areas.

In the shape measuring device according to the present invention, when pixels having luminances corresponding to the light-section line have not been detected in the overall region, it is preferable that the control device sequentially extends the longitudinal regions in the predetermined direction by an amount corresponding to a predetermined number of pixels.

In the shape measuring device according to the present invention, it is preferable that the control device determines the N, according to an amount of noise.

In the shape measuring device according to the present invention, when an amount of noise exceeds a predetermined threshold value, for example, the control device determines the N from a range of 30 or more, and when the amount of noise is less than or equal to the threshold value, the control device determines the N from a range of 1 to 29.

In the shape measuring method according the present invention, it is preferable that the control device determines the predetermined number, according to a movement speed of the object.

In the shape measuring device according to the present invention, it is preferable that the control device determines the predetermined number, according to an amount of change in a shape of the object per unit time, the change being caused by movement of the object.

In the shape measuring device according to the present invention, it is preferable that the control device determines the predetermined number, according to a scanning cycle of the imaging device.

In the shape measuring device according the present invention, when the light-section line has a convex shape in one direction, the control device sets longitudinal regions extending only in the one direction.

In the shape measuring device according to the present invention, when pixels having luminances corresponding to the light-section line have not been detected in the longitudinal regions extending only in the one direction, the control device sets longitudinal regions extending in an opposite direction to the one direction.

In the shape measuring device according to the present invention, it is preferable that the control device sets longitudinal regions extending only in the predetermined direction or an opposite direction to the predetermined direction.

In the shape measuring device according to the present invention, when pixels having luminances corresponding to the light-section line have not been detected in the longitudinal regions, it is preferable that the control device sets longitudinal directions extending in an opposite direction.

The present invention further provides a shape measuring device including: a light source that irradiates slit light onto an object moving in a predetermined direction; an imaging device that captures reflected light reflected at a surface of the object; a filter that allows only reflected light of a predetermined wavelength to pass through the imaging device; and a control device that controls operation of the light source and the imaging device, and measures a stereoscopic shape of the object, based on a light-section line extracted from an image of the reflected light, wherein the control device: extracts the light-section line from the image of the reflected light; sets a rectangle where a top portion and a bottom portion of the light-section line serve as a top side and a bottom side, respectively, and a maximum value in a leftward and rightward direction of change in the light-section line per unit time serves as a left side and a right side; and performs image processing in a region in the rectangle.

In the shape measuring device according to the present invention, it is preferable that the filter includes any one or two or more of a moving average filter, a Gaussian filter, and a median filter.

The present invention further provides a program for causing a computer to perform a shape measuring method that extracts a light-section line from reflected light of slit light projected onto an object moving in a predetermined direction, and measures a stereoscopic shape of the object, based on the light-section line, wherein processes that the program causes the computer to perform include: a first process of drawing an N area division line (N is an integer greater than or equal to 1) in a region including the extracted light-section line, to divide the region into (N+1) small areas, the area division line extending in the predetermined direction; a second process of setting longitudinal regions, each extended in the predetermined direction by an amount corresponding to a predetermined number of pixels, with a position of the light-section line present in a corresponding one of the small areas at a center thereof; and a third process of performing image processing in an overall region of the longitudinal regions provided for each of the small areas, the longitudinal regions being set in the second process.

The present invention further provides a program for causing a computer to perform a shape measuring method that extracts a light-section line from reflected light of slit light projected onto an object moving in a predetermined direction, and measures a stereoscopic shape of the object, based on the light-section line, wherein processes that the program causes the computer to perform include: a first process of setting a rectangle where a top portion and a bottom portion of the extracted light-section line serve as a top side and a bottom side, respectively, and a maximum value in a leftward and rightward direction of change in the light-section line per unit time serves as a left side and a right side; and a second process of performing image processing in a region in the rectangle set in the first process.

Advantageous Effects of Invention

Conventionally, in a shape measuring device for in-line use, since processing time is long, it is difficult to perform a filtering process using a plurality of filters, and thus, the device can only use an optical filter and simple arithmetic processing. Hence, the device cannot eliminate disturbance caused by outside light, reflected light, fumes, heat generation and light emission, etc., which makes it very difficult to measure the correct shape of an object.

The shape measuring methods and the shape measuring devices according to the present invention limit a measurement area for the next process, based on a computation result obtained in the last measurement, enabling to reduce computation time. By the reduction in computation time, a plurality of filters effective for disturbance noise can be used in combination even when used in in-line, enabling to perform an appropriate removal process on various noise on imaging data. Hence, regardless of the state of imaging data, the correct position of a light-section line can be identified, enabling to accurately extract a light-section line with high accuracy. As a result, the correct shape of the object can be measured.

Furthermore, the wavelength of the light source can be changed according to an object. Thus, it is possible to accurately measure even the shape of a heat generating and light emitting object, which is difficult to do using only a conventional software process.

BRIEF DESCRIPTION OF DRAWINGS

FIG. 5 is a diagram showing an example of an image obtained before a smoothing process and an image obtained after the smoothing process.

FIG. 6 is a diagram showing an example of pre-removal and post-removal images for when noise removal is performed using a moving average filter.

FIG. 7(A) is a table showing moving average rates for a 3×3 pixel array, and 7(B) is a table showing moving average rates for a 5×5 pixel array.

FIG. 8(A) is a table showing Gaussian filter rates for a 3×3 pixel array, and FIG. 8(B) is a table showing Gaussian filter rates for a 5×5 pixel array.

FIG. 9 is a diagram showing the luminance values of pixels for a 3×3 pixel array.

FIG. 10 is a diagram showing pre-process and post-process images for when a noise removal process is performed using a median filter.

REFERENCE SIGNS LIST

100: shape measuring device according to first embodiment of present invention
  110: light source
  120: imaging device
  130: filter
  140: shape measurement control device
  141: imaging control unit
  142: memory
  143: image recognizing unit
  144: display
  150: area division line
  151: small area
  152: longitudinal region
  153: region where longitudinal regions are coupled together
  160: light-section line
  161: top portion of light-section line
  162: bottom portion of light-section line
  170: rectangle
  210: rolling section
  220: shape measuring section
  230: cooling section
  240: roll-up section
  250: rolling material

BEST MODE FOR CARRYING OUT THE INVENTION

First Embodiment

Figure 1:
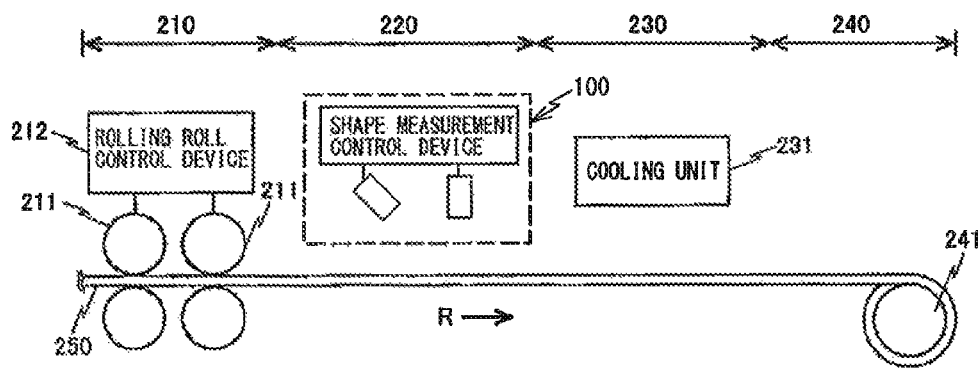
FIG. 1 is a schematic diagram for the case in which a shape measuring device according to a first embodiment of the present invention is applied to a hot rolling line.

FIG. 1 is a schematic diagram for the case in which, as an example, a shape measuring device 100 according to a first embodiment of the present invention is applied to a hot rolling line.

The hot rolling line is composed of a rolling section 210, a shape measuring section 220, a cooling section 230, and a roll-up section 240 such that they are disposed in this order from the upstream side to the downstream side in a transfer direction R of a rolling material 250.

In the rolling section 210 are disposed a rolling rolls 211, and a rolling roll control device 212 that controls the operation of the rolling rolls 211.

The rolling material 250 is transferred in the direction R. First, in the rolling section 210, the rolling material 250 is rolled by the rolling rolls 211 to a predetermined thickness.

The rolling material 250 having passed through the rolling section 210 enters the shape measuring section 220. The shape measuring device 100 according to the first embodiment of the present invention measures the shape of the rolling material 250 in a manner which will be described later.

The result of the measurement of the shape is fed back to the rolling roll control device 212 in the rolling section 210. According to the result, the rolling operation for the rolling material 250 is modified.

After the measurement of the shape of the rolling material 250 is completed, the rolling material 250 enters the cooling section 230 and is cooled by a cooling unit 231. For example, the cooling unit 231 cools the rolling material 250 by emitting cooling water to the rolling material 250.

The cooled rolling material 250 is rolled up by a roll-up roll 241 in the roll-up section 240.

Figure 2:
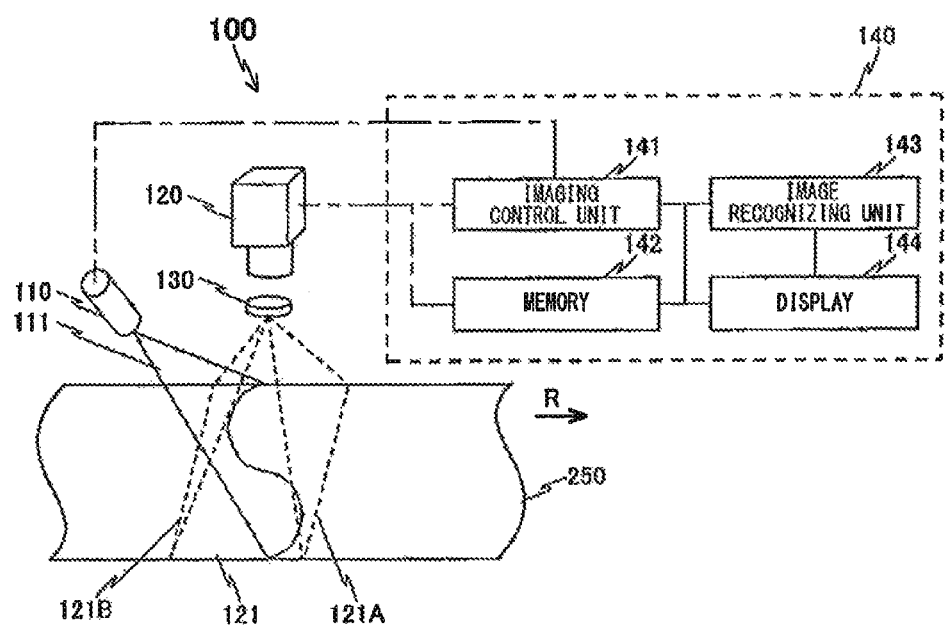
FIG. 2 is a schematic diagram of the shape measuring device according to the first embodiment of the present invention.

FIG. 2 is a schematic diagram of the shape measuring device 100 according to the present embodiment.

The shape measuring device 100 reproduces a stereoscopic shape (three-dimensional shape) of the rolling material 250 by measuring the shape profile of the rolling material 250 rolled in the rolling section 210, to determine whether the rolling material 250 satisfies a predetermined accuracy (flatness, the presence or absence of cracks and tears, etc.).

The shape measuring device 100 according to the present embodiment is composed of a light source 110 that irradiates slit light 111 onto the rolling material 250; an imaging device 120 that captures reflected light which is irradiated from the light source 110 and reflected at a surface of the rolling material 250; a filter 130 that sends only reflected light of a predetermined wavelength to the imaging device 120; and a shape measurement control device 140 that controls the operation of the light source 110 and the imaging device 120.

The light source 110 generates slit light 111 by allowing a point laser beam to pass through, for example, a cylindrical lens, and irradiates the slit light 111 across the full width (across the full length in a direction orthogonal to the transfer direction R) of the rolling material 250.

The imaging device 120 is composed of, for example, a two-dimensional CCD camera.

The imaging device 120 captures an image of reflected light which is reflected at the surface of the rolling material 250. Specifically, the imaging device 120 captures an image of a region 121 including a region where the slit light 111 irradiated from the light source 110 reaches the surface of the rolling material 250 (a region enclosed by two dashed lines 121A and 121B shown in FIG. 2).

The image of reflected light captured by the imaging device 120 is transmitted to the shape measurement control device 140.

The light source 110 is configured to be variable with respect to the imaging device 120, and is configured such that the angle formed by a laser light projection axis of the light source 110 and an optical axis of the imaging device 120 can be changed in a range of about 25 degrees to 160 degrees.

The filter 130 allows only light of the same wavelength as the slit light 111 irradiated from the light source 110 to pass therethrough. Therefore, the imaging device 120 captures only reflected light of the same wavelength as the slit light 111 irradiated from the light source 110.

The filter 130 is composed of any one of a moving average filter, a Gaussian filter, and a median filter which will be described later, or a combination of two or more of these filters.

Note that the filter 130 of the present embodiment is composed of a combination including not only a lens which is hardware, but also a filtering process which is software in the shape measurement control device 140.

The shape measurement control device 140 is composed of an imaging control unit 141 that controls the operation of the light source 110 and the imaging device 120; a memory 142 that stores an image captured by the imaging device 120; an image recognizing unit 143 that analyzes the image stored in the memory 142 to create a shape profile of the rolling material 250; and a display 144 that displays the image stored in the memory 142 and the shape profile created by the image recognizing unit 143.

The imaging control unit 141 controls the operation of the light source 110 and the imaging device 120. Specifically, the imaging control unit 141 performs adjustment of the luminance of the slit light 111 irradiated from the light source 110, adjustment of the irradiation angle of the slit light 111 irradiated from the light source 110, adjustment of an iris of a lens in the imaging device 120, adjustment of imaging time, etc.

The memory 142 is composed of, for example, a frame memory and stores an image transmitted from the imaging device 120 in, for example, 1280×1024 pixels.

The image recognizing unit 143 extracts a light-section line from reflected light in the image stored in the memory 142, and calculates the coordinates (X-coordinates and Y-coordinates) of the light-section line, as image coordinate data. The X-coordinates are the coordinates in the width direction of the rolling material 250, and the Y-coordinates are the coordinates in the transfer direction R of the rolling material 250.

After calculating the image coordinate data, the image recognizing unit 143 calculates a shape profile of the rolling material 250, based on the image coordinate data. The calculated shape profile is normalized and stored in the memory 142 as two-dimensional (X-coordinates and Z-coordinates) normalized coordinate data or displayed on the display 144.

The Z-coordinates are the coordinates in the thickness direction of the rolling material 250.

Figure 3:
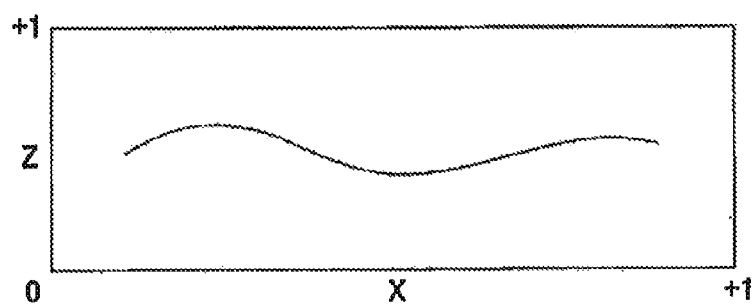
FIG. 3 is a diagram showing an example of a shape profile.

In this manner, the normalized shaped profile is obtained. FIG. 3 shows an example of the shape profile.

Figure 4:
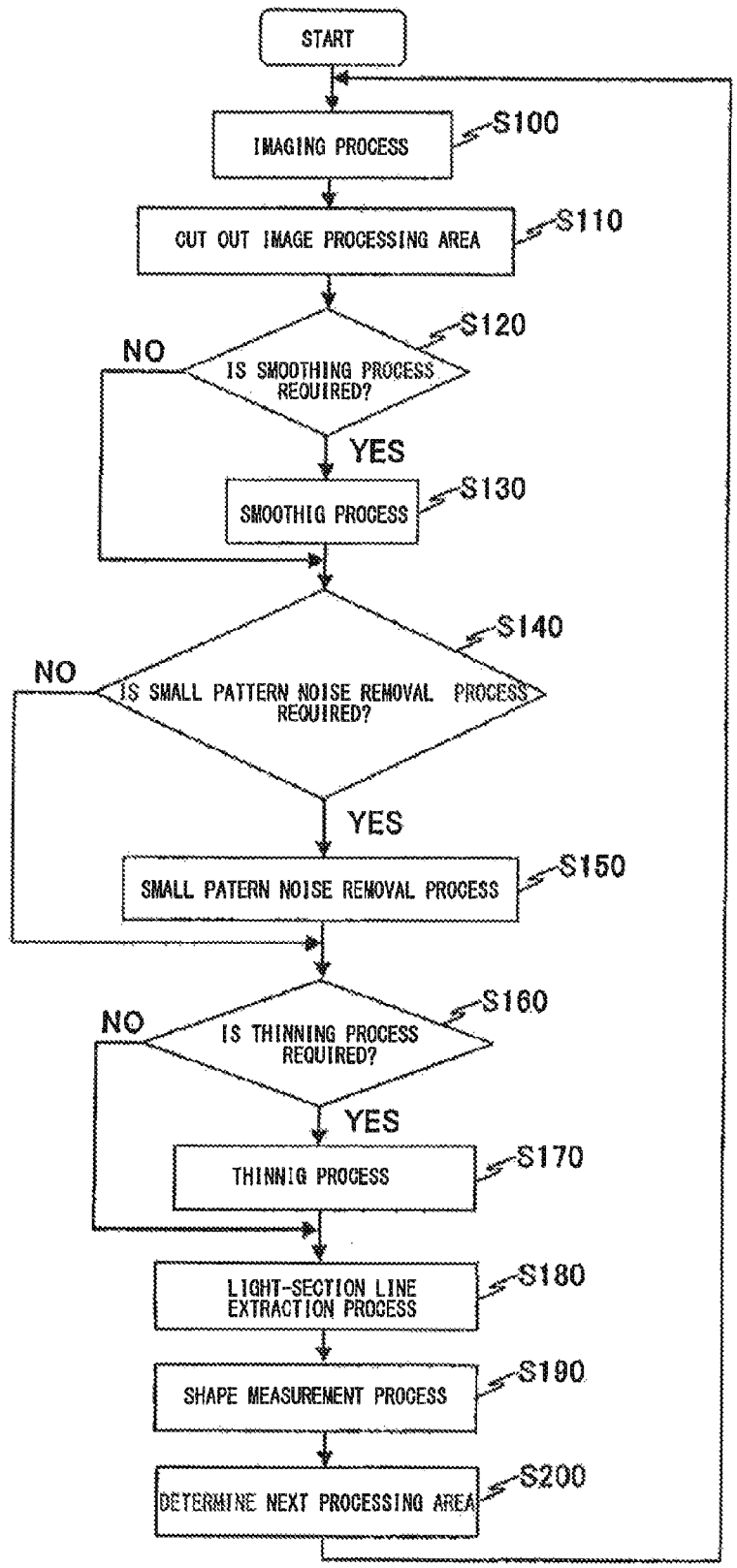
FIG. 4 is a flowchart showing the operation of the shape measuring device according to the first embodiment of the present invention.

FIG. 4 is a flowchart showing the operation of the shape measuring device 100 according to the present embodiment. With reference to FIG. 4, the operation of the shape measuring device 100 according to the present embodiment will be described below.

First, an imaging process (step S100) is performed. Specifically, the light source 110 irradiates slit light 111 onto the surface of the rolling material 250. The imaging device 120 captures a region 121 including a region where the slit light 111 is irradiated, eventually reflected light, and transmits the captured image to the shape measurement control device 140. The image transmitted to the shape measurement control device 140 is saved in the memory 142.

Subsequently, the image recognizing unit 143 cuts out a region where a light-section line is extracted in the image of the reflected light (step S110). Specifically, the image recognizing unit 143 performs the operation of extracting a light-section line only in a predetermined partial region of the entire region of the image transmitted from the imaging device 120, instead of extracting a light-section line in the entire region of the image.

A determination of a region where a light-section line is extracted is performed based on a light-section line extracted immediately before (see step S200 which will be described later). A determination method will be described later.

Subsequently, the image recognizing unit 143 performs a noise removal operation such as that shown below, to remove noise from the image.

First, the image recognizing unit 143 determines whether a smoothing process needs to be performed on the image (step S120).

When the image it not influenced by water droplets or steam (e.g., when it is obvious that the object is dry), a smoothing process is not performed (NO at step S120).

If it is determined that a smoothing process needs to be performed (YES at step S120), a smoothing process is performed in a manner shown below (step S130).

An image where a light-section line is captured includes noise such as fumes, water droplets, or reflected light. Such noise is often distributed in a dot-like manner or a small cluster-manner, By performing a smoothing process on imaging data, such noise components can be reduced.

The process of removing noise uses any one or two or more of a moving average filter, a Gaussian filter, and a median filter which compose the filter 130, in accordance with the state of the image.

By performing a smoothing process on the captured image, dot-like or cluster-like disturbance noise captured at a high luminance is cut off, enabling to clarify an image of the light-section line.

FIG. 5 shows an example of an image obtained before a smoothing process and an image obtained after the smoothing process.

FIG. 6 shows an example of pre-removal and post-removal images for when noise removal is performed using a moving average filter (image citation: Imaging Solution <http://imagingsolution.net/>).

The moving average filter removes noise in an image by smoothing the luminance values of the image.

Specifically, smoothing of luminance is performed by multiplying the luminance values of a focused pixel and its neighboring pixels by moving average rates. By performing this process on the entire captured image, luminance of the entire image is smoothed. The moving average filter performs adjustment such that the result of adding up all of the moving average rates is 1 (cited document: Digital Image Processing, CG-ARTS, ISBN-10 4903474014 <http://imagingsolution.net/>).

FIG. 7(A) shows moving average rates for a 3×3 pixel array, and FIG. 7(B) shows moving average rates for a 5×5 pixel array. In either case, the central pixel is a focused pixel.

In general, the luminance values of neighboring pixels near a focused pixel are often close to the luminance value of the focused pixel, but in many cases, the farther it gets from the focused pixel, the greater the difference in luminance becomes. Taking this into account, a Gaussian filter assigns higher weights which are used when calculating average values, to pixels closer to the focused pixel.

The Gaussian filter has an effect close to that of a low-pass filter, and is effective at removing high-frequency noise. A high frequency refers to a pattern where "bright, dark, bright, dark" are repeated in short cycles.

A process by the Gaussian filter is performed by multiplying the luminance values of a focused pixel and its neighboring pixels by predetermined rates. The Gaussian filter is effective when high-frequency noise is spread over due to the influence of fumes, etc.

FIG. 8(A) shows Gaussian filter rates for a 3×3 pixel array, and FIG. 8(B) shows Gaussian filter rates for a 5×5 pixel array. In either case, the central pixel is a focused pixel.

To delete a specific frequency, data at two separated points with a half-cycle of the frequency are averaged, by which the frequency component can be deleted. The Gaussian filter uses this principle (cited document: Digital Image Processing, CG-ARTS, ISBN-10 4903474014 <http://imagingsolution.net/>).

A median filter is a filter that removes noise by arranging the magnitudes of the luminance values of neighboring pixels of a focused pixel in order, and replacing a median value with the focused pixel. This is suitable for removing salt-and-pepper-like or spike-like noise where the luminance value of a focused pixel greatly differs from those of its neighboring pixels, such as sparks, splash, or disturbance light. This process has an advantage in that a contour or edge of a captured image does not become blurred.

FIG. 9 shows the luminance values of pixels for a 3×3 pixel array (image citation: Imaging Solution <http://imagingsolution.net/>).

The luminance values of neighboring pixels of a focused pixel are obtained, and the luminance values are arranged in ascending order as shown below.

24, 30, 31, 34, 41, 57, 61, 96, 165

Then, 41 which is a median value is replaced with 165 which is a maximum luminance value. By performing this process on all pixels, noise is removed (cited document: Digital Image Processing, CG-ARTS, ISBN-10 4903474014 <http://imagingsolution.net/>).

FIG. 10 shows pre-process and post-process images for when a noise removal process is performed using a median filter (image citation: Imaging Solution <http://imagingsolution.net/>).

After the smoothing process (step S130) is completed, the image recognizing unit 143 determines whether the process of removing small pattern noise other than the light-section line which is spread over the smoothed imaging data is required (step S140).

Since the smoothing process also has the function of removing small pattern noise, if small pattern noise is of such a level that can be removed only by the smoothing process, a small pattern noise removal process is not performed (NO at step S140).

If the image recognizing unit 143 determines that the process is required (YES at step S140), the image recognizing unit 143 performs a small pattern noise removal process (step S150).

Specifically, the image recognizing unit 143 removes small pattern noise by binarizing the processing image and then performing erosion and dilation processes. By this, the light-section line can be further sharpened.

The erosion process refers to the process of replacing all neighboring pixels with black if there is even one black pixel in the neighborhood of the focused pixel, and the dilation process refers to the process of replacing all neighboring pixels with white if there is even one white pixel in the neighborhood of the focused pixel (cited document: Imaging Solution <http://imagingsolution.net/>).

Figure 11:
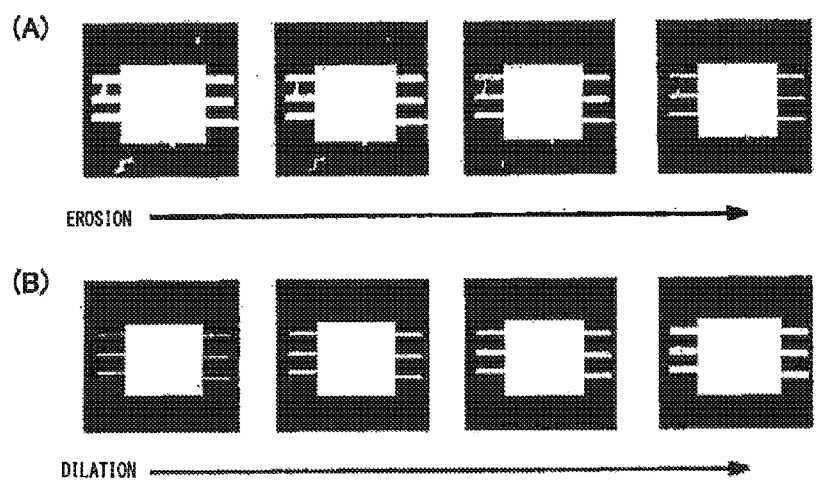
FIG. 11(A) is a diagram showing images in the course of an erosion process.
FIG. 11(B) is a diagram showing images in the course of a dilation process.

FIG. 11(A) shows images in the course of an erosion process, and FIG. 11(B) shows images in the course of a dilation process.

Figure 12:
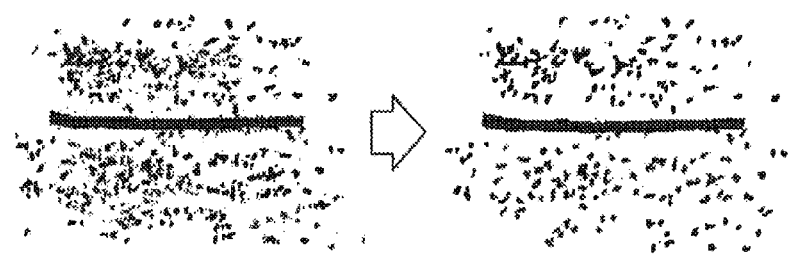
FIG. 12 is a diagram showing an example of images obtained before and after performing erosion and dilation processes on a binarized image.

In addition, FIG. 12 shows an example of images obtained before and after performing erosion and dilation processes on a binarized image.

Note that by performing a dilation process first and then performing an erosion process, a chipped image can be complemented.

FIGS. 13(A) to 13(D) show images showing an example of the above case (image citation: Imaging Solution <http://imagingsolution.net/>).

Figure 13:
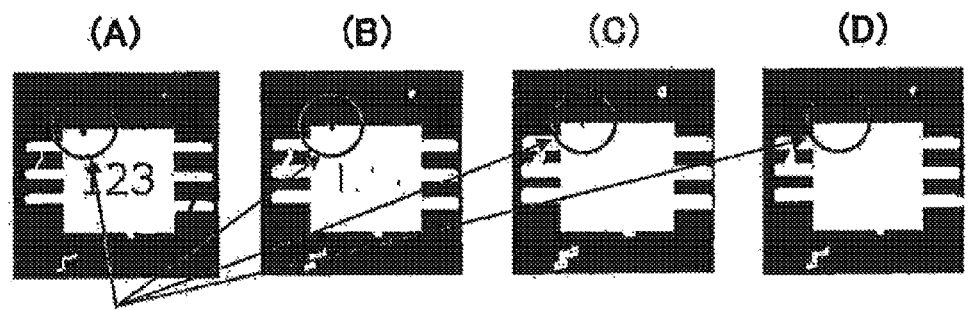
FIGS. 13(A) to 13(D) are diagrams of images showing an example of the case of performing an erosion process after a dilation process.

When, as indicated by the circular mark in FIG. 13(A), there is a relatively large chip, first, a dilation process is performed, followed by an erosion process. By this, as shown in FIG. 13(D), almost all the chip is complemented (i.e., there is almost no chip).

After the small pattern noise removal process (step S150) is completed, the image recognizing unit 143 determines whether a thinning process is required (step S160).

The thinning process is a process for checking whether there is continuity of a remaining pattern. In the thinning process, only one pixel at the center of the pattern is allowed to remain, and other pixels are deleted.

Note that, when the continuity of a pattern can be recognized without performing a thinning process, a thinning process does not need to be performed. Only when the continuity of a pattern cannot be recognized, a thinning process is performed (step S170).

Figure 14:
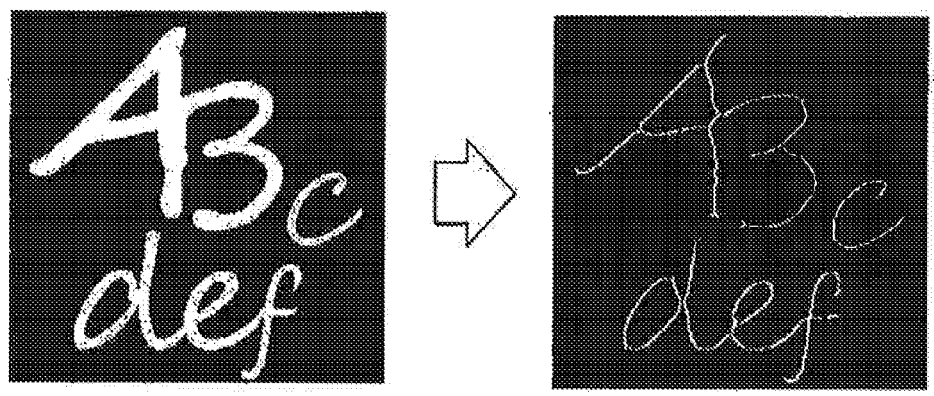
FIG. 14 is a diagram showing an example of images obtained before and after a thinning process.
Figure 15:
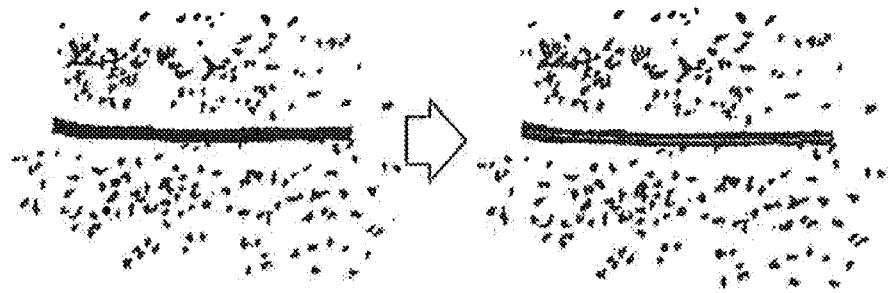
FIG. 15 is a diagram showing an example of images obtained before and after a thinning process.

FIGS. 14 and 15 show examples of images obtained before and after a thinning process.

Figure 16:
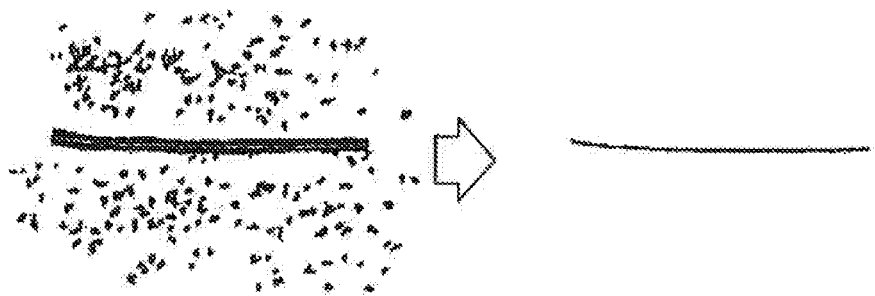
FIG. 16(A) is a diagram of an image showing a light-section line remaining after performing a thinning process.
FIG. 16(B) is a diagram showing an image where only the light-section line is extracted.

Noise that has not been able to be removed by the thinning process becomes very small dots or short lines, and the light-section line remains as a sharp, long line (FIG. 16(A)). The image recognizing unit 143 extracts only a long continuous line in the image, and deletes other images (FIG. 16(B)).

Subsequently, the image recognizing unit 143 extracts the light-section line in a manner shown below (step S180).

Figure 17:
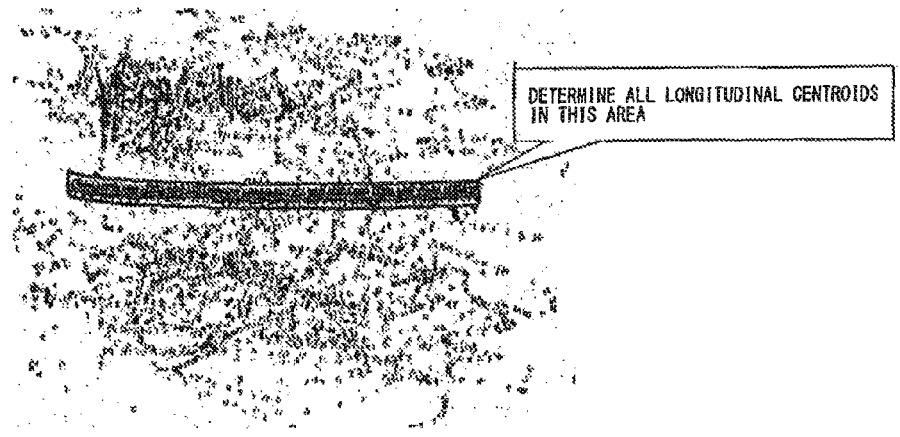
FIG. 17 is a diagram showing an example of an image where an area and a captured image are superimposed on each other.

The image recognizing unit 143 takes an area of an arbitrary range in the upward and downward directions of the extracted continuous line (FIG. 16(B)), and superimposes the area on the captured image. FIG. 17 is an image where the area and the captured image are superimposed on each other.

Note that, when the disturbance noise of the captured image is large, the smoothed image (the image shown in FIG. 5(B)) is used instead of the captured image.

Subsequently, the image recognizing unit 143 computes all of the luminance centroids of pixels in a longitudinal direction in the area. By calculating luminance centroids, accuracy greater than or equal to the number of pixels of the imaging device 120 can be achieved.

In the calculation of luminance centroids, pixels whose luminances are greater than or equal to a threshold value are used as effective pixels.

In addition, upon the calculation of luminance centroids, the image recognizing unit 143 does a search as to whether the luminances greater than or equal to the threshold value are continued in the longitudinal direction. If there is a discontinuous luminance, the luminance is excluded from the calculation.

Table 1 shows an example of a luminance distribution.

TABLE 1

| 10  | 91  | 10  | 11  |
|-----|-----|-----|-----|
| 15  | 16  | 15  | 16  |
| 90  | 91  | 90  | 91  |
| 200 | 201 | 200 | 201 |
| 90  | 91  | 90  | 91  |
| 15  | 16  | 15  | 16  |
| 10  | 11  | 10  | 11  |

When the threshold value of luminance is 77, in the luminance distribution shown in table 1, the pixels in the third to fifth rows from the top (pixels having luminances greater than or equal to the threshold value) are the targets for calculation of centroids.

Although a pixel having a luminance greater than or equal to the threshold value (a pixel having a luminance of 91) is also present at the top of the second column from the left, the pixel is a pixel having a luminance greater than or equal to the threshold value and is not one of the pixels continued in the longitudinal direction (i.e., the pixels in the third to fifth rows from the top). Thus, the pixel is excluded from computation of centroids.

The image recognizing unit 143 calculates all centroids in the longitudinal direction in this manner, and connects the calculated centroids together. The thus connected line is a light-section line (step S180).

After extracting the light-section line, the image recognizing unit 143 computes the shape of the rolling material 250 which is an object, from the shape of the extracted light-section line (step S190).

After extracting the light-section line, eventually the shape of the rolling material 250, in the above-described manner, the image recognizing unit 143 determines a processing area where the next image processing is performed (step S200).

Specifically, to increase the next image processing speed, the image recognizing unit 143 determines the next imaging data processing area, based on the position and shape of the light-section line computed this time. The next image processing (steps S110 to S190) is performed only in a limited processing area determined here.

Figure 18:
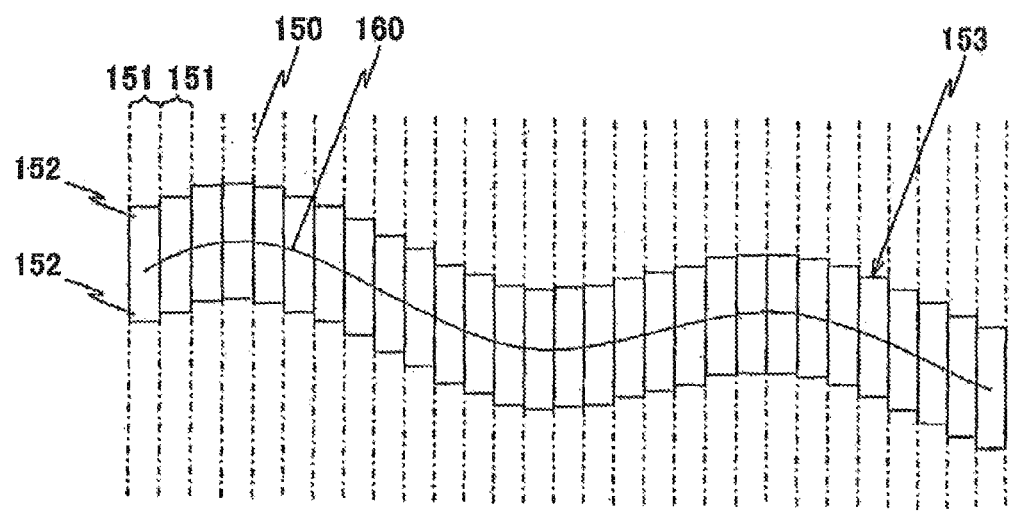
FIG. 18 is a schematic diagram showing the process of determining the next image processing area in the shape measuring device according to the first embodiment of the present invention.

FIG. 18 is a schematic diagram showing the process of determining the next image processing area.

First, the image recognizing unit 143 draws a plurality of area division lines 150 extending in the longitudinal direction (transfer direction R), in a region including the light-section line 160 extracted this time, to divide the region into a plurality of small areas 151. For example, the image recognizing unit 143 draws 30 area division lines 150 to set 31 small areas 151.

Any number can be set as the number of the area division lines 150 (eventually, the number of the small areas 151).

In this case, the image recognizing unit 143 can determine the number of the area division lines 150, according to the amount of noise in the image.

The larger the number of the area division lines 150, the higher the accuracy of noise removal, but reversely, processing time increases. Hence, the image recognizing unit 143 determines the number of the area division lines 150, taking into account the balance between the accuracy of noise removal and the length of processing time.

For example, a threshold value of the amount of noise is determined in advance. When the amount of noise exceeds the threshold value, the image recognizing unit 143 determines the number of the area division lines 150 from a range of 30 or more (e.g., 30 to 50). When the amount of noise is less than or equal to the threshold value, the image recognizing unit 143 determines the number of the area division lines 150 from a range of 1 to 29.

Alternatively, it is also possible to determine the number of the area division lines 150 without determining in advance the threshold value of the amount of noise.

For example, the image recognizing unit 143 can also determine the number of the area division lines 150, according to whether one or both of the smoothing process (step S130) and the small pattern noise removal process (step S150) have been performed.

For example, the image recognizing unit 143 can also determine the number of the area division lines 150 from a range of 1 to 9 when both of the smoothing process (step S130) and the small pattern noise removal process (step S150) have been performed, and determine the number of the area division lines 150 from a range of 10 to 29 when one of the processes has been performed, and determine the number of the area division lines 150 from a range of 30 to 50 when neither of the processes has been performed.

Subsequently, the image recognizing unit 143 sets longitudinal regions 152, each of which is extended in the upward and downward directions by an amount corresponding to an arbitrary number of pixels, with the position of the light-section line present in a corresponding one of the divided small areas 151 at the center thereof.

Any number can be selected as the number of pixels by the amount of which extension in the upward and downward directions is performed.

Basically, the longitudinal regions 152 are determined such that the imaging device 120 can cover a maximum amount of movement for when the rolling material 250 moves in the transfer direction R. Specifically, the imaging device 120 needs to scan an expected maximum amount of movement in the transfer direction R made between the last measurement and the next measurement. Hence, the image recognizing unit 143 determines the number of pixels by the amount of which extension in the upward and downward directions is performed, according to the movement speed of the rolling material 250.

Furthermore, for example, when the rolling material 250 is wavy in the upward and downward directions and thus the degree of change in shape is great, the amount of change in the shape of the rolling material 250 per unit time is large. Alternatively, when the movement speed of the rolling material 250 is high, even with the same shape, the amount of change in the shape of the rolling material 250 per unit time is large.

As such, the maximum number of pixels is determined according to the maximum amount of change where the light-section line changes with the frequency of change in shape before the next imaging is completed, in addition to line speed.

Alternatively, the image recognizing unit 143 can also determine the maximum number of pixels, according to the scanning cycle of the imaging device 120.

For example, it is also possible that when the scanning cycle of the imaging device 120 is 20 [msec], the amount of change in the upward and downward directions during a period of 20 [msec] is determined to be the maximum amount of change, and the image recognizing unit 143 determines the maximum number of pixels, according to the maximum amount of change.

A region 153 where all of the thus determined longitudinal regions 152 are coupled together is used as a region where the next image processing is performed (see step S110).

Note that, if pixels with luminances corresponding to the light-section line 160 have not been able to be found in a region 153 determined after the last image processing, longitudinal regions 152 are gradually extended in the upward and downward directions (eventually, extended to the entire regions in the upward and downward directions), and a search is done again.

According to the shape measuring device 100 according to the present embodiment, the following effects can be obtained.

In a conventional shape measuring device for in-line use, since processing time is long, it is difficult to perform image processing using a plurality of filters, and thus, the device can only use a single optical filter and simple arithmetic processing. Hence, the device cannot take effective action against disturbance caused by outside light, reflected light, fumes, heat generation and light emission of a measurement object, etc., which in turn makes it very difficult to perform accurate shape measurement of a measurement object.

On the other hand, the shape measuring device 100 according to the present embodiment limits a measurement area for the next process, based on a computation result obtained in the last measurement, enabling to reduce computation time.

By the reduction in computation time, a plurality of filters effective for disturbance noise can be used in combination even when used in in-line, which in turn enables to perform an appropriate removal process on various noise on imaging data. Hence, regardless of the state of imaging data, the correct position of a light-section line can be identified with high accuracy, which in turn enables to measure the correct shape of an object even in in-line.

Furthermore, the wavelength of the light source 110 can be changed according to an object. Thus, it is also possible to perform accurate measurement of the shape of a heat generating and light emitting object, which is difficult to do using only a conventional software process.

For example, a heat generating and light emitting rolling material 250 normally emits light having a wavelength of 600 to 750 nm close to red light. Normally, a lamp or laser used as a light source emits intense light in a wavelength band of 600 to 750 nm. Thus, it is difficult to distinguish between light emitted from the rolling material 250 and reflected light. The shape measuring device 100 according to the present embodiment can use a light source 110 that emits light of a wavelength of 380 to 570 nm, in addition to a normal lamp or red laser, and a plurality of cut-off filters 130 suitable for the light source. Thus, even if a measurement object generates heat and emits light, the shape measuring device 100 can perform accurate measurement of the shape of the measurement object.

The shape measuring device 100 according to the present embodiment is not limited in structure to that described above, and various modifications can be made thereto.

For example, although the shape measuring device 100 according to the present embodiment selects the rolling material 250 as a measurement object, the measurement object is not limited to the rolling material 250. The shape measuring device 100 can also be used to measure the shapes of products such as H-shaped steels and sheet piles for construction, in addition to materials obtained immediately after casting, such as slabs, blooms, and billets.

In addition, although, in the shape measuring device 100 according to the present embodiment, the image recognizing unit 143 extends each longitudinal region 152 in the upward and downward directions, with the position of a light-section line present in a corresponding small area 151 at the center thereof, the method of setting the longitudinal regions 152 is not limited thereto.

For example, when a light-section line has a convex shape in one direction (e.g., the upward direction), the image recognizing unit 143 sets longitudinal regions 152 extending only in the one direction. In this case, if pixels having luminances corresponding to the light-section line have not been detected in the longitudinal regions 152 extending in the one direction, then the image recognizing unit 143 sets longitudinal regions 152 extending in the opposite direction to the one direction (e.g., the downward direction).

As such, comparing to the case of extending the longitudinal regions 152 in both of the upward and downward directions, when the longitudinal regions 152 are extended in one direction, if pixels having luminances corresponding to the light-section line have been detected, then the longitudinal regions 152 do not need to be extended in the other direction. Thus, image processing time and the amount of processing can be reduced.

Alternatively, it is also possible that, regardless of whether the light-section line has a convex shape in one direction (e.g., the upward direction), the image recognizing unit 143 sets longitudinal regions 152 extending only in the one direction, and if pixels having luminances corresponding to the light-section line have not been detected in the longitudinal regions 152, then the image recognizing unit 143 sets longitudinal regions 152 extending in the opposite direction to the one direction (e.g., the downward direction).

Second Embodiment

In a shape measuring device 100 according to the above-described first embodiment, an image recognizing unit 143 sets longitudinal regions 152 and determines a region 153 where all of the longitudinal regions 152 are coupled together, to be a region where the next image processing is performed.

On the other hand, in a shape measuring device according to a second embodiment, an image recognizing unit 143 determines a region where the next image processing is performed, in the following manner.

Figure 19:
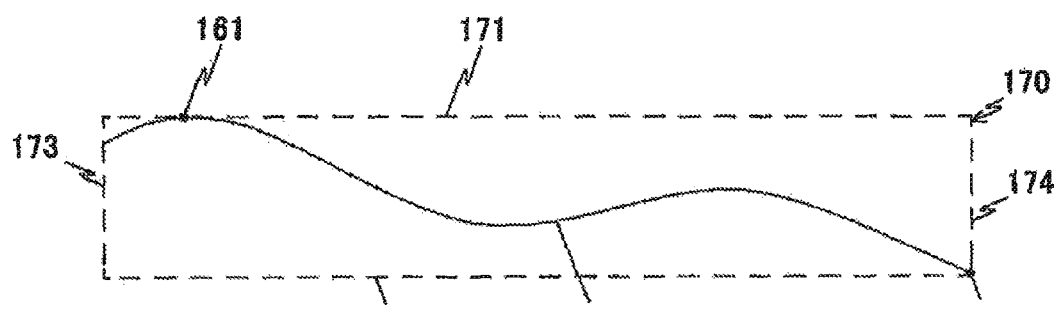
FIG. 19 is a schematic diagram showing the process of determining the next image processing area in a shape measuring device according to a second embodiment of the present invention.

FIG. 19 is a schematic diagram showing the process of determining the next image processing area in the present embodiment.

When the image recognizing unit 143 extracts a light-section line 160 from an image of reflected light, the image recognizing unit 143 sets a rectangle 170 where a top portion 161 and a bottom portion 162 of the light-section line 160 serve as a top side 171 and a bottom side 172, respectively, and the maximum value in a leftward and rightward direction of change in the light-section line 160 per unit time serves as a left side 173 and a right side 174.

The next image processing is performed in the rectangle 170.

According to the present embodiment, unlike the first embodiment, an image does not need to be divided, and thus, processing time can be further reduced.

The invention claimed is:

1. A shape measuring method, comprising
a step of determining an area from which a light-section line is extracted, the step of determining the area comprising:
extracting a light-section line from reflected light of slit light projected onto an object with a stereoscopic shape moving in a predetermined direction;
determining areas in which an image processing is performed by:
drawing N area division lines (N is an integer greater than or equal to 1) in a region including the extracted light-section line, to divide the region into (N+1) small areas, the area division lines extending in the predetermined direction;
sequentially, setting longitudinal regions, each extended in the predetermined direction by an amount corresponding to a predetermined number of pixels, with a position of the light-section line present in a corresponding one of the small areas at a center thereof; and
sequentially, performing the image processing in an overall region of the longitudinal regions provided for each of the small areas, the longitudinal regions being set in the setting step,
measuring the stereoscopic shape of the object based on the light-section line; and
sequentially, determining a next area in which a next image processing is performed based on a location and a shape of the extracted light-section line.

2. The shape measuring method according to claim 1, comprising a fourth step of sequentially extending the longitudinal regions in the predetermined direction by an amount corresponding to a predetermined number of pixels, when pixels having luminances corresponding to the light-section line have not been detected.

3. The shape measuring method according to claim 1, wherein the N is determined according to an amount of noise.

4. The shape measuring method according to claim 1, wherein when the amount of noise exceeds a predetermined threshold value, the N is determined from a range of 30 or more, and when the amount of noise is less than or equal to the threshold value, the N is determined from a range of 1 to 29.

5. The shape measuring method according to claim 1, wherein the predetermined number is determined according to a movement speed of the object.

6. The shape measuring method according to claim 1, wherein the predetermined number is determined according to an amount of change in a shape of the object per unit time, the change being caused by movement of the object.

7. The shape measuring method according to claim 1, wherein in the step of setting longitudinal regions, when the light-section line has a convex shape in one direction, longitudinal regions extending only in the one direction are set.

8. The shape measuring method according to claim 7, wherein when pixels having luminances corresponding to the light-section line have not been detected in the longitudinal regions extending only in the one direction in all of the longitudinal regions, longitudinal regions extending in an opposite direction to the one direction are set.

9. The shape measuring method according to claim 1, wherein in the step of setting longitudinal regions, longitudinal regions extending only in the predetermined direction or an opposite direction to the predetermined direction are set.

10. The shape measuring method according to claim 9, wherein when pixels having luminances corresponding to the light-section line have not been detected in all of the longitudinal regions, longitudinal directions extending in an opposite direction are set.

11. A shape measuring device comprising:
a light source that irradiates slit light onto an object moving in a predetermined direction;
an imaging device that captures reflected light reflected at a surface of the object;
a filter that allows only reflected light of a predetermined wavelength to pass through the imaging device; and
a control device that controls operation of the light source and the imaging device, and measures a stereoscopic shape of the object, based on a light-section line extracted from an image of the reflected light, wherein the control device:
extracts the light-section line from the image of the reflected light;
draws an N area division lines (N is an integer greater than or equal to 1) in a region including the extracted light-section line, to divide the region into (N+1) small areas, the area division lines extending in the predetermined direction;
sets longitudinal regions, each extended in the predetermined direction by an amount corresponding to a predetermined number of pixels, with a position of the light-section line present in a corresponding one of the small areas at a center thereof;
performs image processing in an overall region of the longitudinal regions provided for each of the small areas;
measures the stereoscopic shape of the object based on the light-section line; and
determines a next area in which a next image processing is performed based on a location and a shape of the extracted light-section line.

12. The shape measuring device according to claim 11, wherein when pixels having luminances corresponding to the light-section line have not been detected in the overall region, the control device sequentially extends the longitudinal regions in the predetermined direction by an amount corresponding to a predetermined number of pixels.

13. The shape measuring device according to claim 11, wherein the control device determines the N, according to an amount of noise.

14. The shape measuring device according to claim 11, wherein when an amount of noise exceeds a predetermined threshold value, the control device determines the N from a range of 30 or more, and when the amount of noise is less than or equal to the threshold value, the control device determines the N from a range of 1 to 29.

15. The shape measuring method according to claim 11, wherein the control device determines the predetermined number, according to a movement speed of the object.

16. The shape measuring device according to claim 11, wherein the control device determines the predetermined number, according to an amount of change in a shape of the object per unit time, the change being caused by movement of the object.

17. The shape measuring device according to claim 11, wherein the control device determines the predetermined number, according to a scanning cycle of the imaging device.

18. The shape measuring device according to claim 11, wherein when the light-section line has a convex shape in one direction, the control device sets longitudinal regions extending only in the one direction.

19. The shape measuring device according to claim 18, wherein when pixels having luminances corresponding to the light-section line have not been detected in the longitudinal regions extending only in the one direction, the control device sets longitudinal regions extending in an opposite direction to the one direction.

* * * * *